United States Patent
Shim et al.

(10) Patent No.: US 9,198,039 B2
(45) Date of Patent: Nov. 24, 2015

(54) METHOD AND DEVICE FOR UPDATING FIRMWARE BASED ON DEVICE MANAGEMENT COMMAND

(71) Applicant: LG ELECTRONICS INC., Seoul (KR)

(72) Inventors: Jonghoon Shim, Changwon-Si (KR); Hyoungjun Park, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/723,292

(22) Filed: Dec. 21, 2012

(65) Prior Publication Data

US 2013/0167134 A1    Jun. 27, 2013

(30) Foreign Application Priority Data

Dec. 23, 2011    (KR) ......................... 10-2011-0141446

(51) Int. Cl.
*G06F 12/02*    (2006.01)
*H04W 12/06*    (2009.01)
*G06F 9/445*    (2006.01)

(52) U.S. Cl.
CPC ................. *H04W 12/06* (2013.01); *G06F 8/65* (2013.01); *G06F 8/665* (2013.01)

(58) Field of Classification Search
CPC ............... G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| | | | |
|---|---|---|---|
| 2004/0040019 A1* | 2/2004 | Ha ................................ | 717/168 |
| 2006/0149956 A1* | 7/2006 | Chang .................... | G06F 9/441 713/1 |
| 2007/0283343 A1* | 12/2007 | Aridor et al. .................. | 717/174 |
| 2009/0030965 A1* | 1/2009 | Hayes, Jr. ..................... | 709/200 |
| 2009/0064124 A1* | 3/2009 | Chung ........................... | 717/168 |
| 2009/0222650 A1* | 9/2009 | Chen ............................. | 713/1 |
| 2011/0314462 A1* | 12/2011 | Clark et al. ................... | 717/169 |
| 2012/0096451 A1* | 4/2012 | Tenbarge et al. ............. | 717/170 |
| 2012/0117555 A1* | 5/2012 | Banerjee et al. .......... | G06F 8/65 717/168 |
| 2013/0111461 A1* | 5/2013 | Zubas et al. .................. | 717/173 |

OTHER PUBLICATIONS

Zhao et al., Dynamic Memory Balancing for Virtual Machines, 2009.*

* cited by examiner

*Primary Examiner* — Wei Zhen
*Assistant Examiner* — Zhan Chen
(74) *Attorney, Agent, or Firm* — KED & Associates LLP

(57) ABSTRACT

An electronic device includes a memory including a first storage area in an active state and a second storage area in an inactive state, and a first controller configured to execute a first operating system stored in the first storage area, and execute a management command for firmware update on the first operating system, wherein the first controller receives the management command from a management serer, receives update data based on the management command, store the update data in the second storage area, activates the second storage area, deactivates the first storage area, and executes an updated first operating system within the update data.

10 Claims, 10 Drawing Sheets

METHOD AND DEVICE FOR UPDATING FIRMWARE BASED ON DEVICE MANAGEMENT COMMAND

CROSS-REFERENCE TO RELATED APPLICATION

Pursuant to 35 U.S.C. §119(a), this application claims the benefit of earlier filing date and right of priority to Korean Application No. 10-2011-0141446, filed on Dec. 23, 2011, the contents of which is incorporated by reference herein in its entirety.

BACKGROUND OF THE INVENTION

1. Field of the Invention

This specification relates to a method and device for updating firmware, and particularly, to a method and device for updating firmware based on a device management command.

2. Background of the Invention

A device management refers to a technology of providing functions of user-oriented settings, remote management, updating and the like for electronic devices. The device management technology may be used during fabrication of a product, and for the purposes of an initial setting after purchase of a product, collectively updating of errors and corrections, remote management of a product, and the like.

Techniques established by Open Mobile Alliance (OMA) are being used as application programs in a mobile communication field and standardization techniques in a service field. The OMA handles mobile web, web browsing, Digital Rights Management (DRM) solution, Internet Protocol (IP) multimedia, device management, mobile broadcast, mobile associated document standardization and the like, in order to facilitate interoperability of mobile data services.

Especially, the standardization for the device management technology in OMA allows for wireless execution of processes, such as firmware updating, software downloading, new services, error correcting and the like. It is thusly required to establish detailed procedures for updating firmware, which includes a program, in which an operation of performing a device management function is implemented, an operation system for control of other devices, and the like.

SUMMARY OF THE INVENTION

Therefore, an aspect of the detailed description is to provide a method for updating firmware based on a device management message.

Another aspect of the detailed description is to provide a method for updating firmware by stably receiving the firmware using an area present in an inactive state.

Another aspect of the detailed description is to provide a method for updating firmware associated with home appliances based on an OMA device management standard.

To achieve these and other advantages and in accordance with the purpose of this specification, as embodied and broadly described herein, there is provided an electronic device including a memory including a first storage area in an active state and a second storage area in an inactive state, and a first controller configured to execute a first operating system stored in the first storage area, and execute a firmware update management command on the first operating system.

The one exemplary embodiment and other exemplary embodiments may include one of the following features.

The first controller may receive the management command from a management serer, receive update data based on the management command, store the update data in the second storage area, activate the second storage area, deactivate the first storage area, and execute an updated first operating system within the update data. The update data may have a form of a firmware image including the updated first operating system. The update data may include data for an updated portion of the first operating system or the updated entire first operating system. The management command may be received through exchange of control messages based on an Open Mobile Alliance (OMA) device management standard. Also, the management command may instruct execution of downloading and updating.

The electronic device may further include a second controller configured to execute a second operating system for controlling a home appliance function. Here, the memory may further include a third storage area to store the second operating system, and the first controller may store an updated second operating system within the update data in the third storage area. The first controller may store the updated second operating system in the third storage area by transmitting the updated second operating system through a Universal Asynchronous Receiver/Transmitter (UART). The first and second controllers may be implemented by using separate hardware. Also, the first controller may be connected to a display module of the electronic device.

A firmware updating method may be disclosed in accordance with one exemplary embodiment. The method may include receiving address information related to update data from a management server through a device management session, receiving the update data based on the address information, storing the update data in a storage area present in an inactive state, converting the storage area into an active state, and executing an updated first operating system included in the update data, the update data having stored in the storage area converted into the active state.

The one exemplary embodiment and other exemplary embodiments may include one of the following features.

The method may further include storing an updated second operating system in another accessible storage area accessible by a Micro-controller Unit (MCU), the updated second operating system being included in the update data within the storage area.

Also, the address information related to the update data may be received through a message exchanging based on an Open Mobile Alliance (OMA) device management standard.

An electronic device according to the exemplary embodiments may execute a firmware updating based on a device management message.

The electronic device may include a memory which is divided into an area where a currently executed operating system is stored and an area where an operating system to be updated is stored, whereby the currently executed operating system may be less influenced by errors even if such errors are generated during a firmware updating process.

The firmware updating may be executed based on the device management message even if a plurality of operating systems of the electronic device are provided in different environments, respectively.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs, and should not be construed in an excessively comprehensive meaning or an excessively restricted meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element can be directly connected with the other element or intervening elements may also be present. In contrast, when an element is referred to as being "directly connected with" another element, there are no intervening elements present.

Embodiments of the present invention will be described below in detail with reference to the accompanying drawings, where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

The term "terminal" used in this description may be replaced by User Equipment (UE), Mobile Equipment (ME), Mobile Station (MS), User Terminal (UT), Subscriber Station (SS), Mobile Subscriber Station (MSS), wireless device, handheld device, Access Terminal (AT) and the like.

Figure 1:
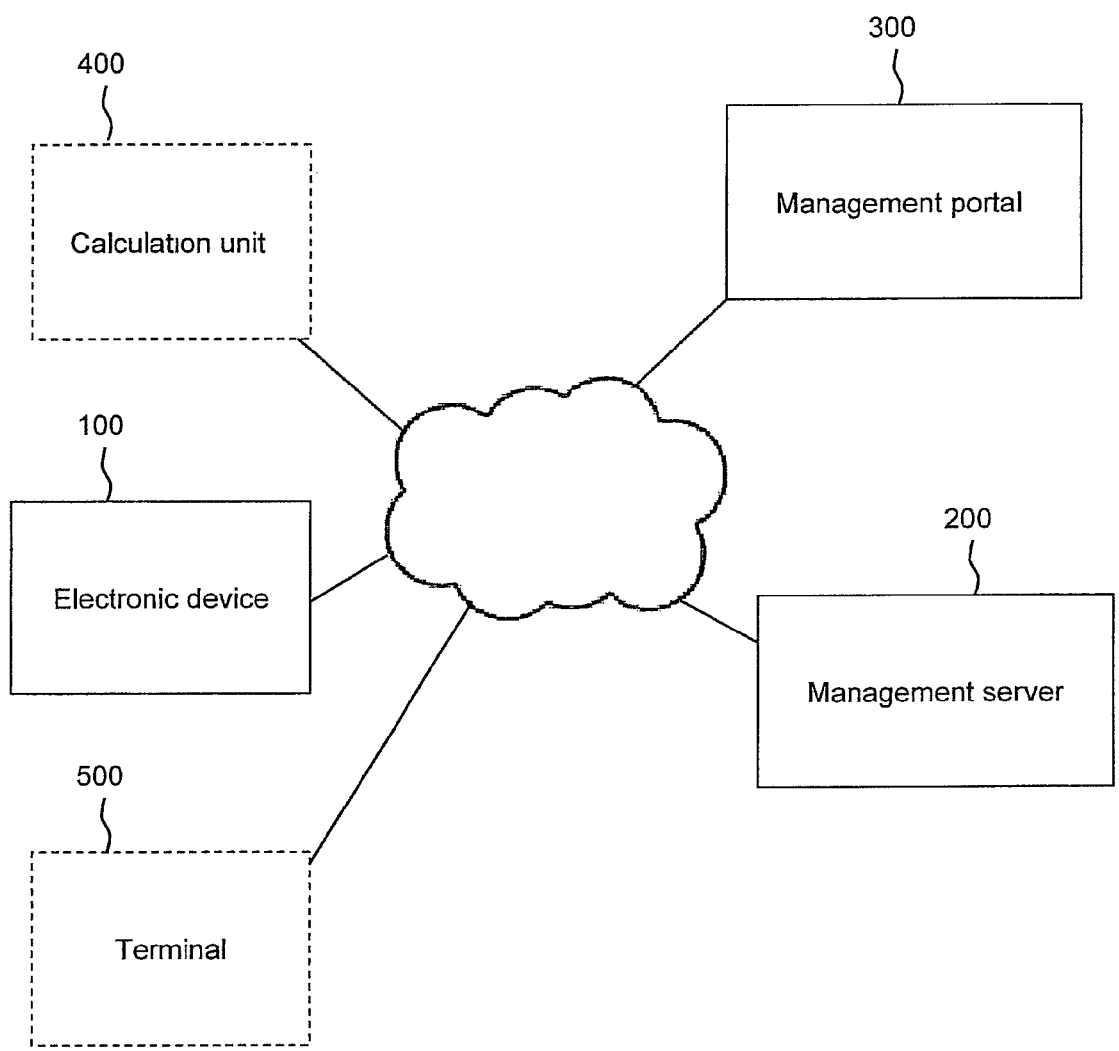
FIG. 1 is a view illustrating a device management system to which a technology according to this specification is applied.
Figure 2:
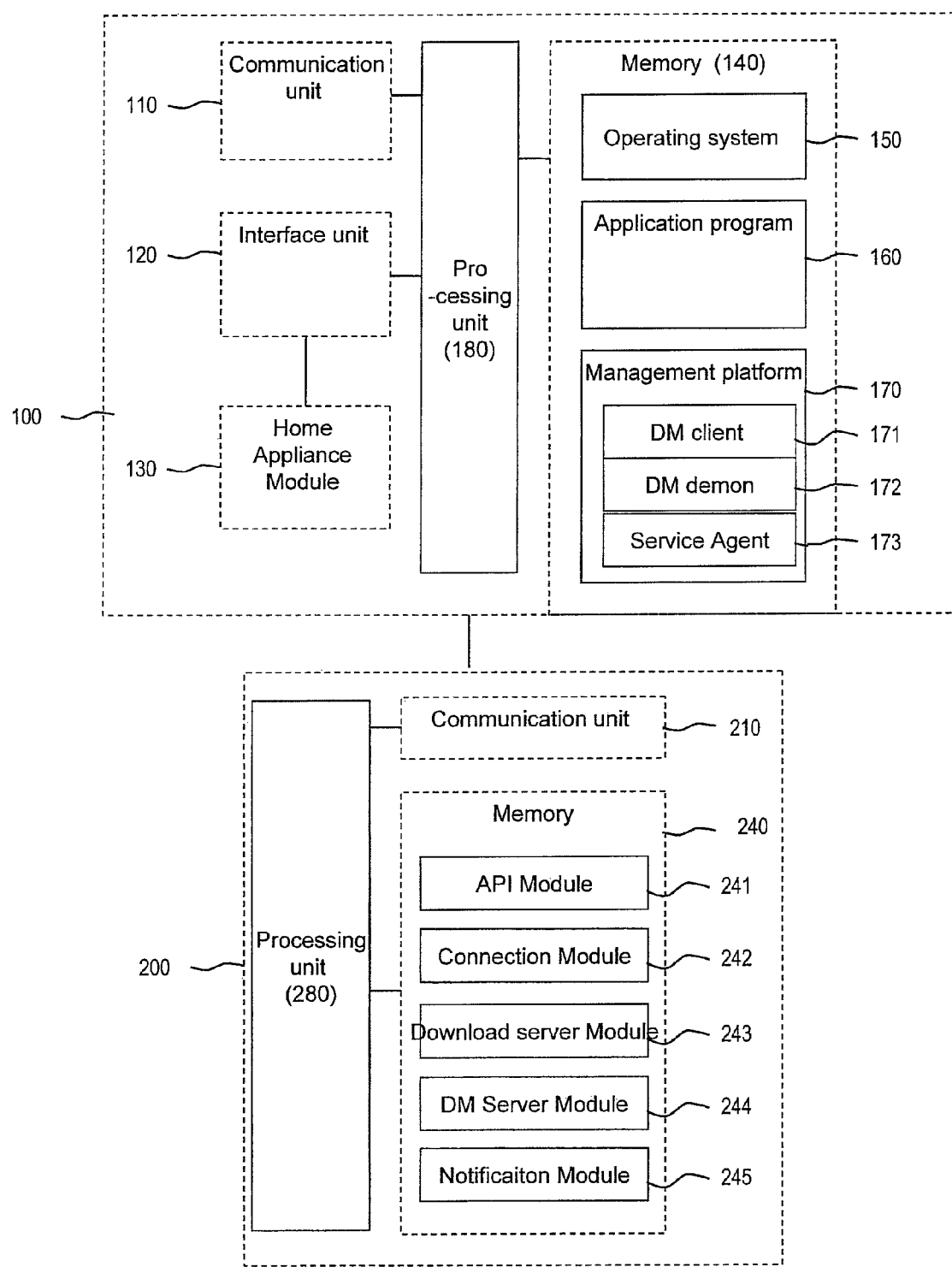
FIG. 2 is a view illustrating an electronic device to which the technology according to this specification is applied in accordance with one exemplary embodiment.

Hereinafter, description will be given of entities disposed in a device management system in accordance with the exemplary embodiments disclosed in this specification, with reference to FIGS. 1 and 2. FIG. 1 is a view illustrating a device management system to which a technology according to this specification is applied, and FIG. 2 is a view illustrating an exemplary embodiment of an electronic device to which the technology according to this specification is applied.

As illustrated in FIG. 1, the device management system may include an electronic device 100 and a management server 200.

The electronic device 100 is a target to be managed, and corresponds to various types of home equipment, communication equipment and the like. The electronic device 100 may perform a management command requested by the management server 200. The electronic device 100 may be an home appliance. The electronic device 100 may include a home appliance module 130 corresponding to hardware related a home appliance function. The electronic device 100 may be an intelligent home appliance having application programs for utilizing the home appliance module 130 according to various ways.

The management server 200 may be a device for executing a management service for the electronic device 100. Especially, the management server 200 may include modules for transmitting a management command execution request to the electronic device 100, and receiving the execution result of the management command from the electronic device 100 to provide to a user. The configuration of the electronic device 100 and the management server 200 will now be described in detail with reference to FIG. 2.

The device management system may further include a management portal 300. The management portal 300 is a server which provides user subscription and support services for the electronic device 100. The management portal 300 may perform several functions, such as managing a user of the electronic device 100, and performing a product authentication of the electronic device 100. The management portal 300 may be a device or a service system which is run by a manufacturer of the electronic device 100 or a seller of the electronic device 100.

Meanwhile, the device management system may further include a calculation unit 400. The calculation unit 400 is a device for accessing a service provided by the management portal 300. The calculation unit 400, for example, may be a device which is provided with a networking function and user interfaces, such as a personal computer and the like. The calculation device 400 may be used for managing information related to the electronic device 100 or user information.

The device management system may further include a terminal 500. The terminal 500 is used to access a management service for the electronic device 100 provided by the management server 200. The terminal 500 may use the management service using an Application Programming Interface (API) module provided by the management server 200. The terminal described in this specification corresponds to a random electronic device capable of accessing the management server to use a management service for an electronic device including a DM client, and should be construed as meaning including, for example, a portable phone, a cellular phone, a smart phone, a Personal Digital Assistant (PDA), a Portable Multimedia Player (PMP), a tablet device, a computer, a multimedia device and the like.

Referring to FIG. 2, the electronic device 100 may include a communication unit 110, an interface unit 120, a memory 140, and a processing unit 180.

The communication unit 110 is a communication module for transmitting or receiving a control message for executing a management command, data required to execute the management command, an execution result of the management command, and the like, to or from the management server 200. The communication unit 110 may include a wireless communication module 111 or a wired communication module 112 for communicating with the management server 200. Especially, the wireless communication module 111 is a module for communication with a device located within a short distance. For example, the wireless communication module 111 may be a module, which supports short-range communication techniques, such as Bluetooth, Radio Frequency Identification (RFID), Infrared Data Association (IrDA), Ultra Wideband (UWB), Zigbee, Wireless LAN (protocols, such as Bluetooth, 802.11n, etc.), and the like.

The interface unit 120 may serve as a path connected to the home appliance module 130 within the electronic device 100. The interface unit 120 may allow the home appliance module 130 to transmit and receive a control signal and status information based upon a management command. The interface unit 120 may be implemented in the form of a library required for performing a management command between the home appliance module 130 and a DM client 171 or DM demon 172.

The home appliance module 130 connected via the interface unit 120, for example, may be hardware which performs a washing function, a cooking function, a cleaning function or a keeping (storing) function, for example. In detail, the processing unit 180 may control the home appliance module 130 connected thereto via the interface unit 120 according to a control method included in an application program 160 stored in the memory 140.

The memory 140 may store a program for operations of the processing unit 180 and temporarily store input/output data.

Also, the memory 140 may store various software components. In detail, the memory 140 may store an Operating System (OS) 150, an application program 160, and a management platform 170. The memory 140 may further store software components, which include a module operably connected to the communication unit 110, and a module operably connected to the interface unit 120.

The operating system 150 (for example, LINUX, UNIX, OS X, WINDOWS, Chrome, Symbian, WinCE, Windows Mobile, iOS, Android, Bada, VxWorks, pSOS or other embedded operating systems) may include various types of software components and/or drivers for controlling system tasks such as memory management, power management and the like.

In the meantime, the operating system 150 of the electronic device 100 may be implemented such that a plurality of operating systems can be cooperative with each other. That is, the electronic device 100 may be configured such that different operating systems can be executed according to a type of task executed, a quantity of available resources under an execution environment, and the like. Also, the processing unit 180 may be implemented to include a plurality of controllers, and in this case, the plurality of operating systems may serve as operating systems for operations of the respective controllers.

If it is assumed that the operating system 150 includes a first OS and a second OS, the first OS may be an OS to provide an operation environment of a hardware which executes a home appliance function of the electronic device 100, and the second OS may be a common OS to provide an environment for executing a general application program of supporting an operation of a user interface or the communication unit 110 of the electronic device 100. For example, the first OS may be an OS which provides an environment with less resources, such as a real-time OS executed on a Micro Controller Unit (MCU), and the second OS may be a common OS, in which various application programs are executable, among embedded operating systems.

The memory 140 may be configured to store a plurality of operating systems in different areas. For example, the memory 140 may be divided into a first area for storing the first OS and a second area for storing the second OS. The first and second areas may be divided using physically different hardware or logically different partitions.

When the memory 140 is divided into a plurality of areas, each area may be activated or deactivated. An area in an activated state within the memory 140 may store a currently used application program or operating system, and an area in a deactivated state may store an application program or operating system which is not currently used, and especially, an application program or operating system to be updated.

In the meantime, the operating system 150 may be varied through a firmware update process. The firmware update process may be executed based on a management command which the terminal 500 transmits to the DM client 171 via the DM server. The management command for the firmware updating may be a command for requesting for execution of an upgrade function.

The application program 160 refers to a program which is executed on the operating system 150.

The application program 160 may include a program for a specific function of the home appliance module 130 mounted in the electronic device 100. In detail, the processing unit 180 may control the home appliance module 130 connected to the interface unit 120 according to the application program 160.

For example, when a hardware related to a washing function is mounted in the electronic device 100, control signals and state collection signals for managing a washing module, such as a washing drum control unit, a washing water supply unit, a sensing unit, a detergent adjusting unit, a vibration adjusting unit or a level adjusting unit, may be transmitted and received via the interface unit 120. Here, the control signals for managing the washing module may be processed according to the application program 160, which indicates a washing method in response to a washing course, which sets method, order, time, and count of washing, rinsing and dehydrating based on information related to a target to be washed, such as a material of clothes, texture and the like.

As another example, when a hardware related to a cooking function is mounted in the electronic device 100, control signals and state collection signals for managing a cooking module, such as a cooking unit, a power/fuel control unit, a lighting unit, an air-conditioning unit or a sensing unit, may be transmitted and received via the interface unit 120. Here, the control signals for managing the cooking module may be processed according to the application program, which indicates a cooking method based on a driving mode, a cooking course or a recipe.

As another example, when a hardware related to a cleaning function is mounted in the electronic device 100, control signals and state collection signals for managing a cleaning module, such as a driving unit, a cleaning unit, an obstacle detecting unit, a position recognizing unit or a sensing unit, may be transmitted and received via the interface unit 120. Here, the control signals for managing the cleaning module may be processed according to the application program 160 which indicates a cleaning method.

As another example, when a hardware related to a keeping function is mounted in the electronic device 100, control signals and state collection signals for managing a storing module, such as a cooling unit, a temperature control unit, a sensing unit or a power control unit, may be transmitted and received via the interface unit 120. Here, the control signals for managing the storing module may be processed according to the operating system 160 which indicates a storing method based on a keeping mode, a mature mode or a preserving mode.

Meanwhile, the application program 160 may be varied according to a software update process. The software update process may be executed based on a management command that the terminal 500 transmits to the DM client 171 via the DM server. The management command for the software updating may be a command for requesting for execution of an upgrade function.

The management platform 170 refers to a management program executed on the operating system 150.

The management platform 170 may include a Device Management (DM) client 171. The DM client 171 may transmit and receive management messages for managing the electronic device 100 to and from the DM server.

The DM client 171 may manage the home appliance module 130 mounted in the electronic device 100, for example, performs functions, such as monitoring, diagnosis, upgrade, remote control and the like, with respect to the home appliance module 130.

The monitoring function is to monitor a state of the home appliance module 130. The DM client 171 may execute the monitoring function so as to collect events or log data generated in the home appliance module 130. For example, when a hardware related to a washing function is mounted in the electronic device 100, the DM client 171 may allows the hardware related to the washing function to collect events or log data for items, which include an operating state, a remaining time, an initially set time, a washing course number, a rinsing level, a dehydration RPM, temperature or a scheduled washing time.

The diagnosis function is to diagnose the state of the home appliance module 130. The DM client 171 may execute the diagnosis function so as to acquire detection or diagnosis of errors generated in the home appliance module 130 through an agent.

The upgrade function is to update a firmware, a service or an application program of the electronic device 100. The DM client 171 may execute the upgrade function so as to update the operating system 150, the application program 160 and the management platform 170 stored in the memory 140. Besides, the DM client 171 may execute the upgrade function so as to update software components, which include a module operably connected to the communication unit 110, and a module operably connected to the interface unit 120.

The remote control function is to control the electronic device 100 from a remote place. The DM client 171 may execute the remote control function so as to control an operation of the home appliance module 130. For example, when a hardware related to a storing function is mounted in the electronic device 100, the DM client 171 may instruct the hardware related to the storing function to perform a temperature control of a refrigerating chamber, a freezing chamber or the like, or perform a function such as an express freezing or the like.

The management platform 170 may include a Device Management (DM) daemon 172. The DM daemon 172 may receive a notification message, which is transmitted from a notification module of the management server 200, for the DM client 171. The DM daemon 172 may perform a function of processing exceptions of the DM client 171.

The management platform 170 may include a service agent 173. The service agent 173 may be used by the DM client 171 to control a hardware within the electronic device 100 according to a management command or used by the processing unit 180 to control the hardware by executing the application program.

The memory 140 may include at least one of storage media, including Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disk, an optical disk, a flash memory type, a hard disk type, a multimedia card micro type, a memory card type (e.g., SD or DX memory), and the like. Also, the memory 140 may be implemented in the form of a storage area by a storage function, which is provided by a network storage or a cloud service connected via the communication unit 110.

The processing unit 180 may control components of the electronic device 100 to perform the exemplary methods disclosed in this specification. That is, the processing unit 180 may control the communication unit 110, the interface unit 120 and the memory 140.

The processing unit 180 may be configured to execute software components stored in the memory 140. The controller 180 may control the home appliance module 130 connected to the interface unit 120 according to the application program 160.

The processing unit 180 may be implemented by individually including a plurality of controllers. For example, the processing unit 180 may be implemented to include individual controllers to execute corresponding operating systems. Also, the processing unit 180 may be implemented to separately include a Micro Control Unit (MCU) to control home appliance modules according to functions, and a controller to execute various control operations by activating a common operating system.

When the processing unit 180 is divided into a plurality of controllers, unlike the MCU implemented on a separate board, a controller which executes a common operating system may be connected to a display module or the like of the electronic device 100.

The processing unit 180 may execute or update the application program 160 to perform a management command received from the management server 200 according to the exemplary embodiments of the present disclosure.

Referring to FIG. 2, the management server 200 may include a communication unit 210, a memory 240 and a processing unit 280.

The communication unit 210 may communicate with the electronic device 100 and the terminal 500.

The memory 240 may store a program for operations of the processing unit 280, and temporarily store input/output data. Especially, the memory 240 may store modules for transferring a request for executing a management command received from the terminal 500 to the electronic device 100, and receiving an execution result of the management command from the electronic device 100. In detail, the memory 240 may include at least one of an Application Programming Interface (API) module 241, a connection module 242, a download server module 243, a Device Management (DM) server module 244, and a notification module 245.

First, the API module 241 is an interface module for providing a DM service to an external terminal or an application program of the management server 200. More concretely, the API module 241 may include at least one of interface functions, such as authenticating whether or not a terminal or application program desired to access a DM service is permitted, remotely diagnosing the electronic device 100, monitoring the electronic device 100, controlling an application program of the electronic device 100, and controlling the home appliance module 130 of the electronic device 100. Here, the functions for providing interfaces may be provided by an independent device such as the API server.

Next, the connection module 242 may perform a message transfer function for transferring a management command request message transmitted from an external terminal of the management server 200 to the electronic device 100 and transferring an execution result of the management command in response to the management command request message from the electronic device 100 to the management server 200. Here, the message transfer function may be executed by an independent device such as the connection server.

The download server module 243 may perform a function of transmitting download data to the electronic device 100. The download server module 243 may be a module for transmitting download data based upon an OMA download standard. Here, the function of transmitting the download data may be performed by an independent device such as the download server.

The DM server module 244 may perform a function of requesting for performing a management command and receiving an execution result of the management command through transmission and reception of control messages to and from a DM client, which is disposed in the electronic device 100 to perform a function associated with the device management. The DM server module 244 may transmit and receive messages for the management command based on an OMA DM standard. The function of transmitting and receiving the control messages for the device management may be performed by an independent device such as the DM server.

The notification module 245 may perform a notification function of transmitting and receiving notification messages for the device management to and from the electronic device 100. The notification module 245 may allow for an exchange of messages between the electronic device 100 and the DM server module in a pushing manner. Also, the notification function may be performed by an independent device such as the notification server.

FIGS. 1 and 2 illustrate that the management server 200 is implemented in the form of a single device. The management server 200 may alternatively be divided into a plurality of servers for playing different roles according to an implemented form. For example, the management server 200 may be divided into an API server, a connection server, a download server, a DM server and a notification server. Here, the division of the management server 200 into the plurality of servers are merely illustrative, and it should not be construed that the configuration and method of the management server 200 according to the present disclosure are limited to the form of being implemented as independent servers.

The processing unit 280 may control components of the management server 200 to perform the exemplary methods according to the present disclosure. That is, the processing unit 280 may control the communication unit 210 and the memory 240. The processing unit 280 may be configured to execute modules stored in the memory 240.

Figure 3:
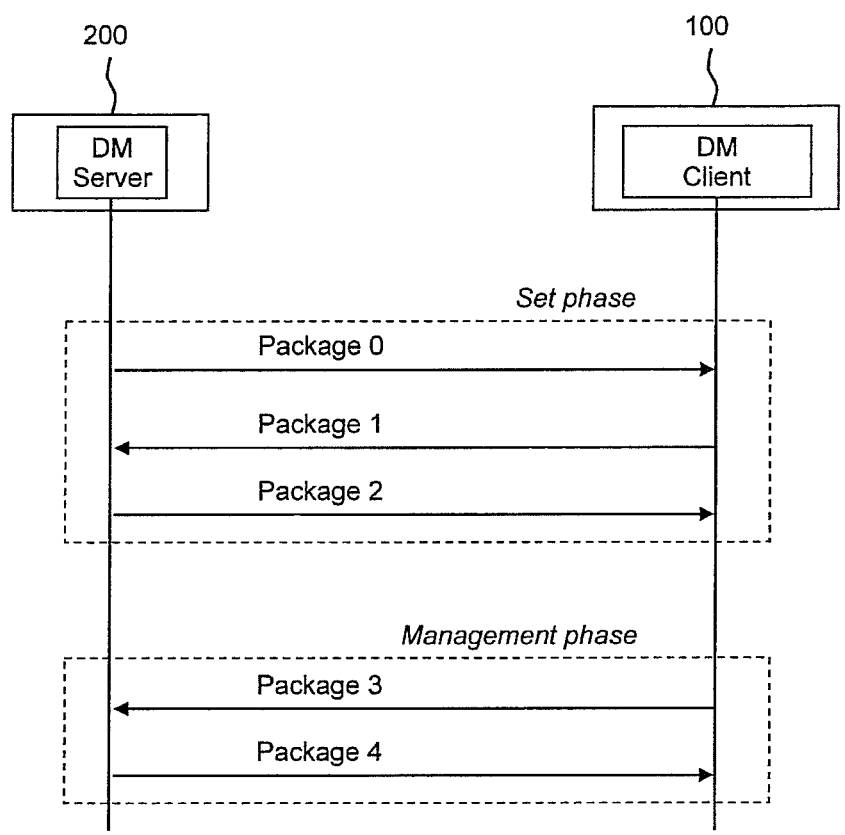
FIG. 3 is a view illustrating processes that an electronic device and a management server conforming to an OMA device management standard exchange messages for device management.

FIG. 3 is a view illustrating processes that an electronic device and a management server conforming to an OMA device management standard exchange messages for device management.

As illustrated in FIG. 3, a DM server within the management server 200 may perform management for the electronic device 100 by exchanging control messages based on an OMA DM standard with the DM client 171 within the electronic device 100.

The management server 200 and the electronic device 100 may perform a setup phase operation by transmitting and receiving a package 0 (Package #0), package 1 (Package #1) and a package 2 (Package #2). The setup phase indicates a step of exchanging authentication information and device information.

In detail, the management server 200 transmits the packet 0, which corresponds to a trigger message for starting a management session, to the electronic device 100. Upon reception of the package 0, the electronic device 100 transmits the package 1, which includes authentication information (credentials) related to the DM client 171 and device information, to the management server 200. After reception of the package 1, the management server 200 inspects the authentication information related to the DM client 171. When the inspection result is valid, the management server 200 transmits the package 2, which includes authentication information related to the DM server and a management command, to the electronic device 100.

Next, the management server 200 and the electronic device 100 may perform a management phase operation by transmitting and receiving a package 3 (Package #3) and a package 4 (Package #4). The management phase indicates a step of transmitting the execution result of the management command, which has been transmitted in the setup phase, to the management server 200. The packages of the management phase may be continuously transmitted and received until the transmission of the management command execution result is completed.

In detail, the electronic device 100 transmits the package 3, which includes a response to the management command, to the management server 200. Upon reception of the package 3, the management server 200 transmits the package 4 to the electronic device 100 when an additional process for the management command is required.

As aforementioned, in the exchange of the control messages based on the OMA DM standard, the packages correspond to data written in a markup language, such as a Synchronization Markup Language (SyncML) message. The packages are transmitted and received by being included in a body of request/response according to Hypertext Transfer Protocol (HTTP). Also, for exchanging the packages, the electronic device 100 and the management server 200 may use various types of transmission protocols. If the electronic device 100 has a wireless communication function, the electronic device 100 may use Short Message Service (SMS) or Wireless Application Protocol (WAP) push for transmission of the packages. On the other hand, if it has an Internet Protocol (IP) based network communication function, the electronic device 100 may use a connection via a general Transport Control Protocol (TCP) socket, a connection via Secure Socket Layer (SSL) or the like.

Figure 4:
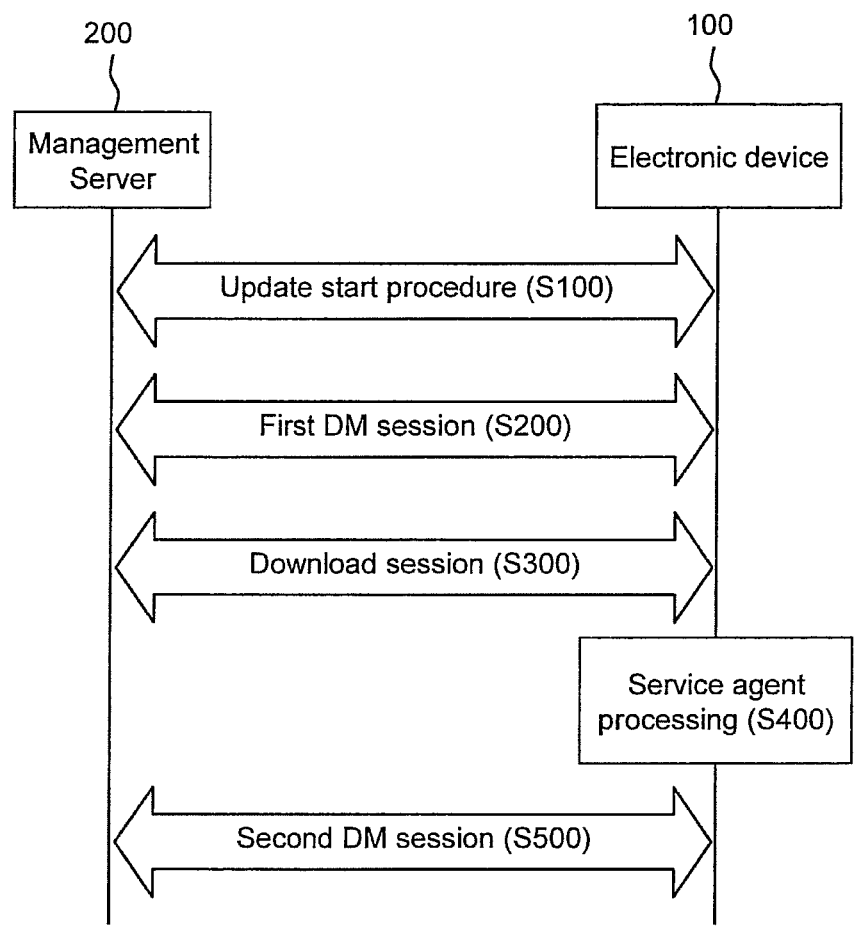
FIG. 4 is a flowchart schematically illustrating a method for updating firmware based on a firmware update command received from the management server.

Hereinafter, description will be given of a method for updating firmware according to the present disclosure with reference to FIG. 4. FIG. 4 is a flowchart schematically illustrating a method for updating firmware based on a firmware update command received from the management server.

The management server 200 performs an update start procedure (S100).

Through the update start procedure S100, the management server 200 notifies to the electronic device 100 that a firmware of the electronic device 100 is required to be updated.

Alternatively, a user may transfer a management command for performing a firmware update to the management server 200 via the terminal 500. Here, an authentication procedure, such as a login or the like, may be performed between the terminal 500 and the management server 200, and the management command for the firmware update of the electronic device 100 may be transmitted to the management server 200.

Afterwards, the management server 200 transfers a firmware update command to the electronic device 100 by a first DM session (S200). The first DM session may be a control message based on the OMA DM standard. More concretely, the management server 200 may transfer to the electronic device 100 address information required to download update data, which includes a firmware to be updated according to the request of the electronic device 100.

Afterwards, the electronic device 100 performs a download process based on the address information related to the update data, acquired by the firmware update command (S300). The update data received through the download process S300 may be stored in an area in an inactive state within the memory of the electronic device 100.

The electronic device 100 then performs a firmware update process based on the downloaded update data (S400). The firmware update process S400 is to update a currently used firmware, and corresponds to a control process for performing an operating system or application program, which is to be updated within the update data. To this end, the electronic device 100 may convert the area, in which the currently used firmware is stored within the memory, into an inactive (deactivated) state, and convert an area, in which the operating system or application program to be updated, into an active (activated) state. Also, when an operating system or application program to be performed by another controller is present in the update data, the electronic device 100 may store the operating system or application program in a specific area within the memory so as for the another controller to perform it.

Afterwards, the electronic device 100 notifies a processed result of the firmware update command by a second DM session, if necessary (S500).

Hereinafter, description will be given of a detailed exemplary embodiment of the firmware updating method with reference to FIGS. 5 to 10. FIGS. 5 to 7 and FIG. 10 are flowcharts sequentially showing a method of updating firmware by an electronic device based on a firmware update command.

Figure 5:
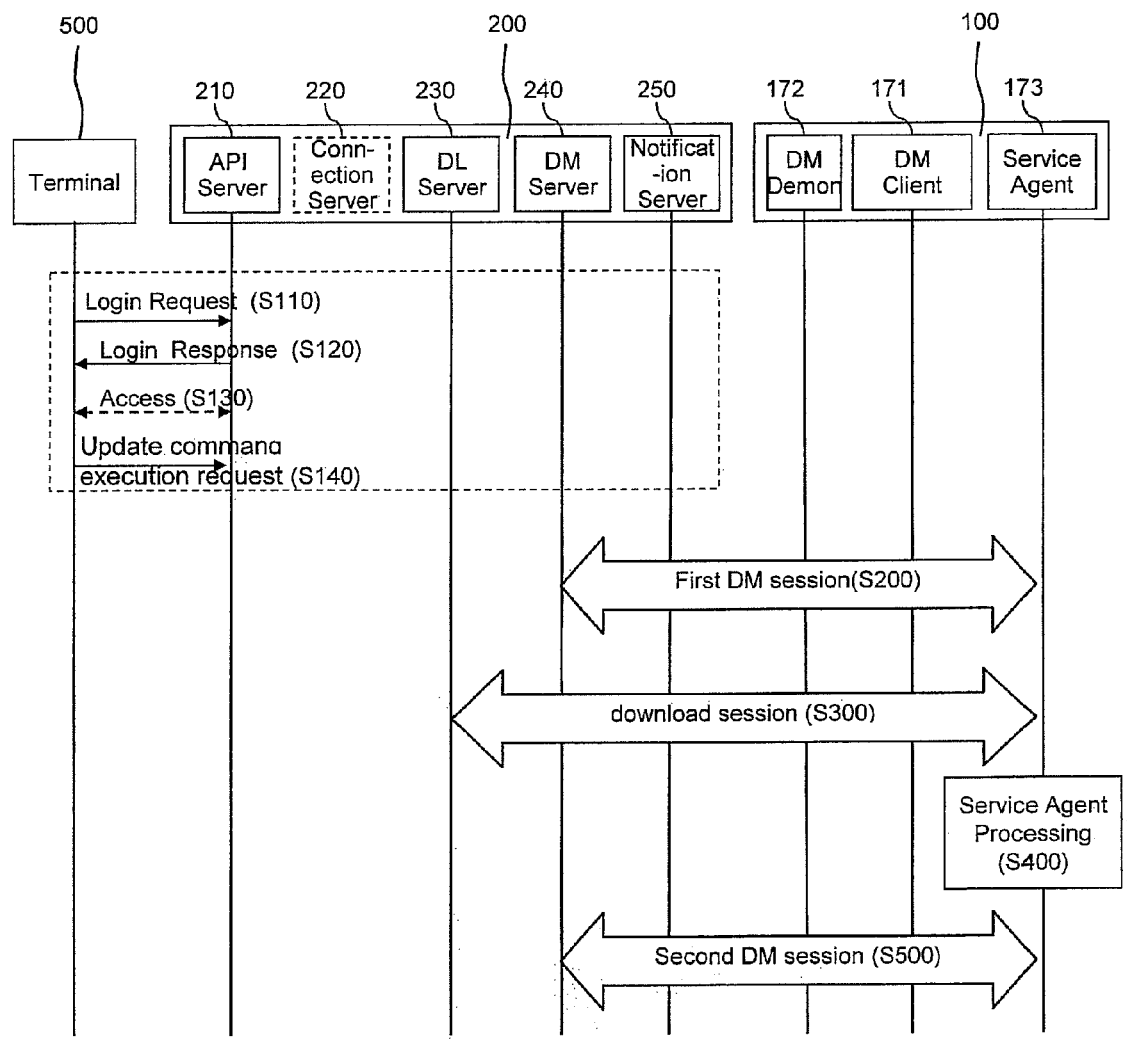
FIGS. 5 to 7 are flowcharts schematically illustrating a method in which an electronic device updates firmware based on a firmware update command.

The start procedure (S100) for the firmware update will be described in detail with reference to FIG. 5. When the firmware update start procedure S100 is started in response to a request of the terminal 500, the management server 200 may perform a process of inspecting whether or not the terminal 500 is permitted to request for a management command with respect to the electronic device 100.

In detail, the terminal transmits a login request message to the management server 200 (S110). The login request message may include information for authenticating the terminal 500 or an application program for a device management performed in the terminal 500. The management server 200 may provide an API type interface formed to allow an application program, which is being executed by an external device, to perform the management command for the electronic device 100. The management server 200 authenticates an application program, a device or a user which or who calls the interface, in order for a permitted application program or device to call the interface. The login request message may be an authentication message used to inform that the electronic device 100 is allowed to use the interface.

The management server 200 inspects authentication information included in the login request message, and transmits a login response message to the terminal 500 when it is confirmed based on the inspection result of the authentication information included in the login request message that the terminal 500 or the application program for the device management performed in the terminal 500 is allowed to request for the management command from the management server 200 (S120).

The login response message may include access information which the terminal 500 requires to request for the execution of the management command. The access information may be access information related to the management server 200 for receiving the request for a real-time type management command. For example, the access information may be an IP address or TCP port of the management server 200.

Afterwards, the terminal 500 accesses the management server 200 to request for performing the management command for the firmware update (S140).

Figure 6:
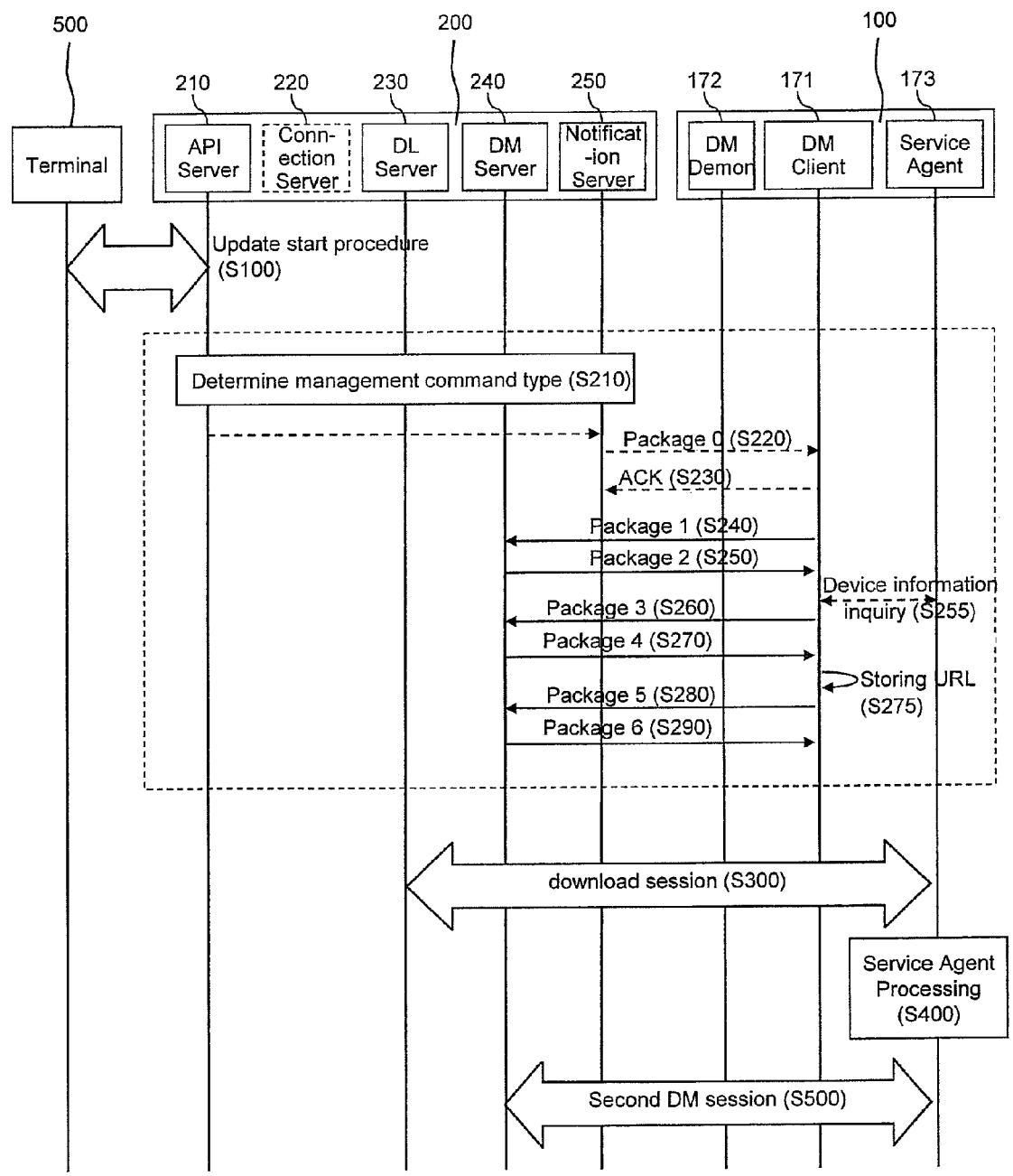

The first DM session S200 will be described in detail with reference to FIG. 6. The management server 200 may perform, with the electronic device 100, a process of transferring the management command for the firmware update based on a type of firmware update management command.

First, the management server 200 determines a type of the requested management command (S210). The type of management command may be distinguished according to a method of transmitting or receiving a control message for performing the management command between the management server 200 and the electronic device 100. When the type of management command is a real-time type command which should be performed within a predetermined time, transmissions of the management command execution request and the execution result may be performed in a relay manner through a connection-oriented session. When the type of management command is a non-real-time type command, the transmissions of the management command execution request and the execution result may be performed by transmitting and receiving control messages based on the OMA DM standard. The management command for updating the firmware or software of the electronic device corresponds to performing the updating at a predetermined time, so the management command may be determined to sufficiently have a non-real-time characteristic.

Afterwards, a device management session for transferring the firmware update command may be performed. In detail, the management server 200 transmits a trigger message to the electronic device 100 (S220). More concretely, the trigger message for instructing reception of the management command may be a package 0 generated based on the OMA DM standard. Next, the management server 200 transmits an acknowledgement (ACK) message with respect to the instruction message to the management server 200 (S230).

Upon reception of the instruction message, the electronic device 100 transmits a message, which includes authentication information related to the DM client 171, to the management server 200 (S240). The message including the authentication information related to the DM client 171 may be a package 1 generated based on the OMA DM standard.

After reception of the authentication information related to the DM client 171, the management server 200 verifies the authentication information related to the DM client 171. When the authentication information related to the DM client 171 is valid, the management server 200 transmits a message including authentication information related to the DM server 240 to the electronic device 100 (S250). The message including the authentication information related to the DM server 240 may be a package 2 generated based on the OMA DM standard.

Upon reception of the authentication information related to the DM server 240, the electronic device 200 verifies the authentication information. When the authentication information related to the DM server 240 is valid, the DM client 171 may inquire device information including a firmware version via the service agent 173 (S255).

The electronic device 100 then transmits a package 3, which includes the firmware version, to the management server 200 (S260). The management server 200 may thus determine whether or not it is necessary to update the firmware based on the firmware version.

When it is determined to update the firmware, the management server 200 transmits a package 4, which includes address information related to update data including a firmware to be updated, to the electronic device 100 based on the firmware update command requested from the terminal 500 (S270). The address information related to the update data may be URL, PkgURL, or Correlator information.

Upon reception of the package 4, the electronic device 100 stores the address information related to the update data (S275), and transmits a package 5 to inform that the update command through the package 4 has been stored (S280). The management server 200 then transmits a package 6 in response to the package 5 (S290).

The update command may be a command which instructs only downloading, or a command which instructs both downloading and updating. When the update command is configured to instruct only the downloading, the electronic device 100 may separately perform the following update process.

Figure 7:
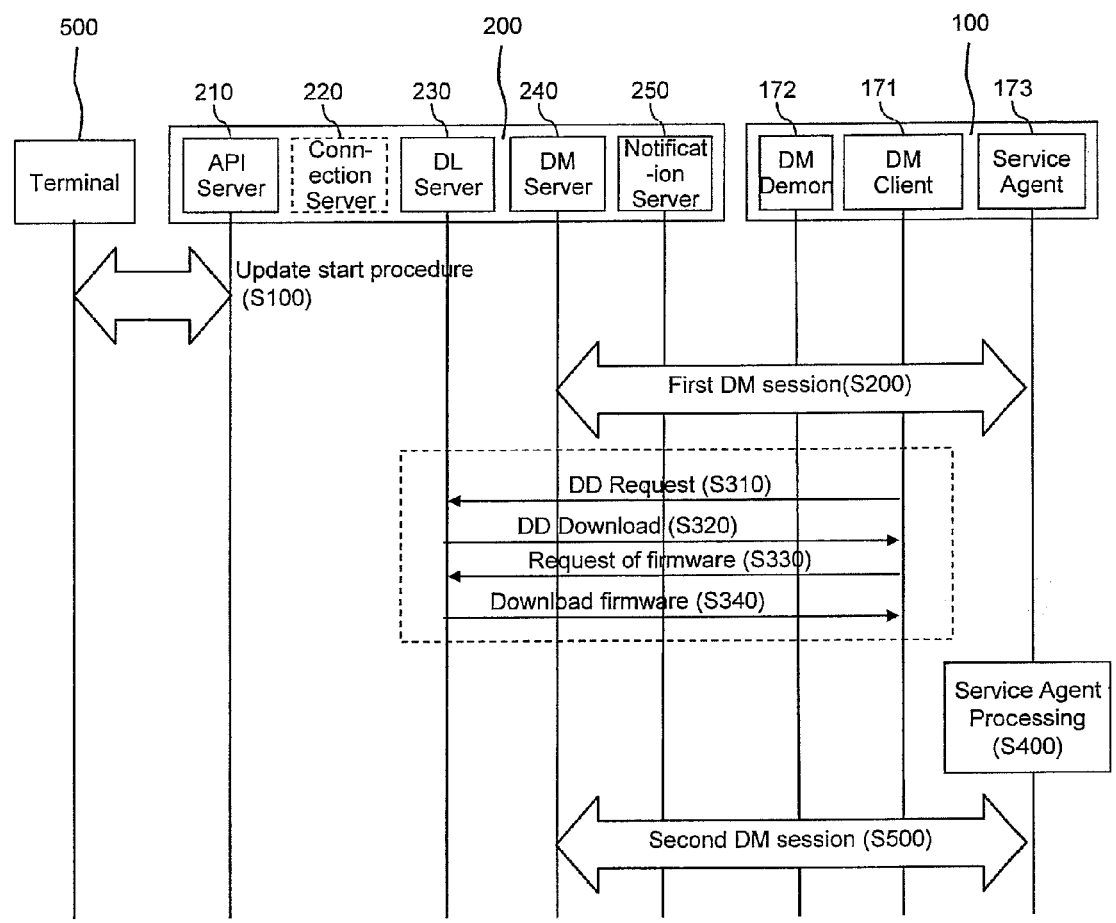

Hereinafter, a download session (S300) will be described in detail with reference to FIG. 7. The electronic device 100 may execute a downloading process based on the URL information (PkgURL) related to the stored update data according to the received firmware update command.

First, the electronic device 100 requests the management server 200 to transmit a Download Descriptor (DD) for update data to be downloaded by using URL of DD extracted from the stored URL information (S310), and downloads the DD for the update data to be downloaded from the management server 200 (S320). Afterwards, the electronic device 100 requests the management server 200 to transmit update data using the URL of the update data extracted from the stored URL information (S330), and downloads the update data from the management server 200 (S340).

Figure 8:
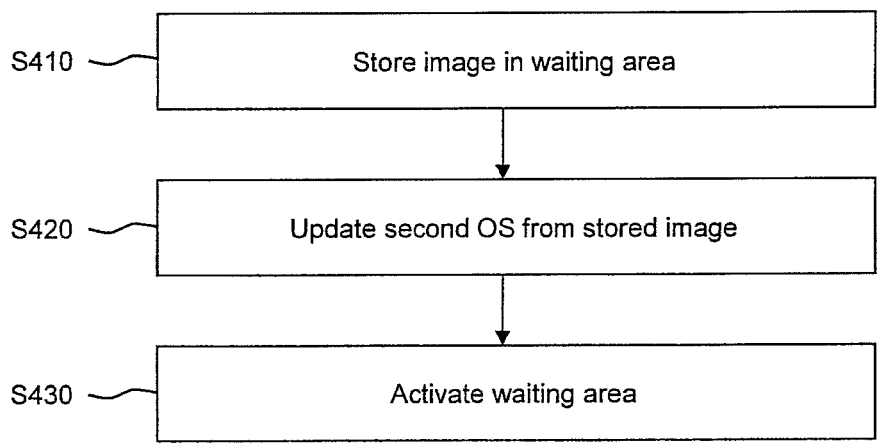
FIGS. 8 and 9 are views illustrating a process that a service agent processes the firmware update command.
Figure 9:
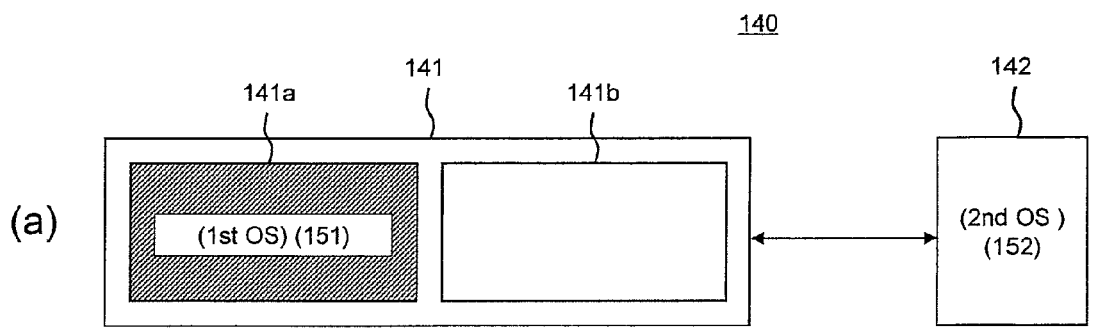
Figure 9:
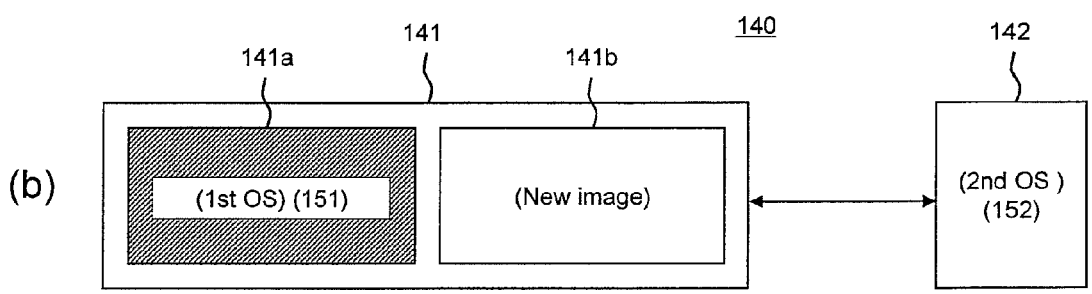
Figure 9:
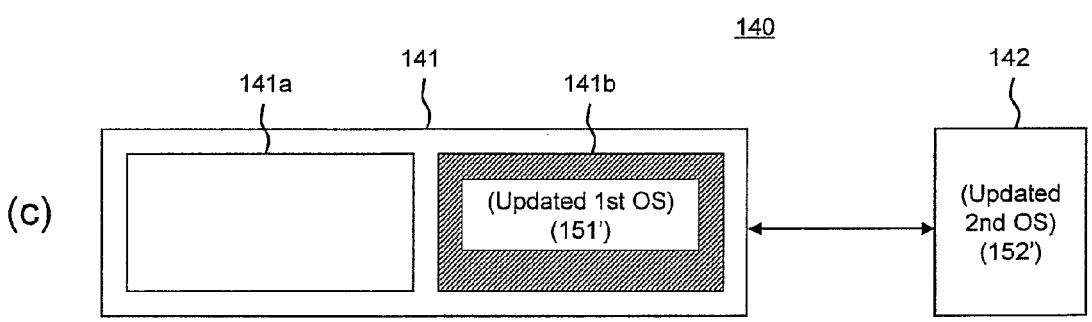

Hereinafter, a process (S400) of processing the firmware management command by the service agent will be described in detail with reference to FIGS. 8 and 9.

First, the electronic device 100 stores the update data in a waiting (standby) area (S410). The waiting area may indicate an area, which is not being used by a controller in a memory for storing firmware, namely, an area in an inactive state within the memory. For example, referring to FIG. 9A, the memory 140 may be divided into a first area 141a, a second area 141b, and a third area 142. The first area 141a and the second area 141b may be areas used for a first operating system, and the third area 142 may be an area used for a second operating system. When the first area 141a is in an active state and the second area 141b is in an inactive state, the electronic device 100 may store the received update data in the second area 141b as illustrated in FIG. 9B.

Here, the update data may be data in the form of a firmware image, which includes a new first operating system to be updated based on the firmware update command.

Alternatively, the update data may be a type of data which includes data for a portion to be updated of the first operating system.

Afterwards, when the update data includes a second operating system, the electronic device 100 performs an updating operation by storing the second operating system in the third area 142 (S420). The second operating system may be an operating system for controlling a home appliance module. The electronic device 100 may separately include a controller for executing the second operating system. The controller may transmit an updated second operating system 152' through a Universal Asynchronous Receiver/Transmitter (UART) so as to store the updated second operating system in the third storage area. Referring to FIG. 9C, the second operating system 152' transmitted through the UART is stored in the third area 142 in an executable state.

The electronic device 100 then converts the waiting area into an active state such that the updated first operating system 151' included in the update data can be executable (S430).

Figure 10:
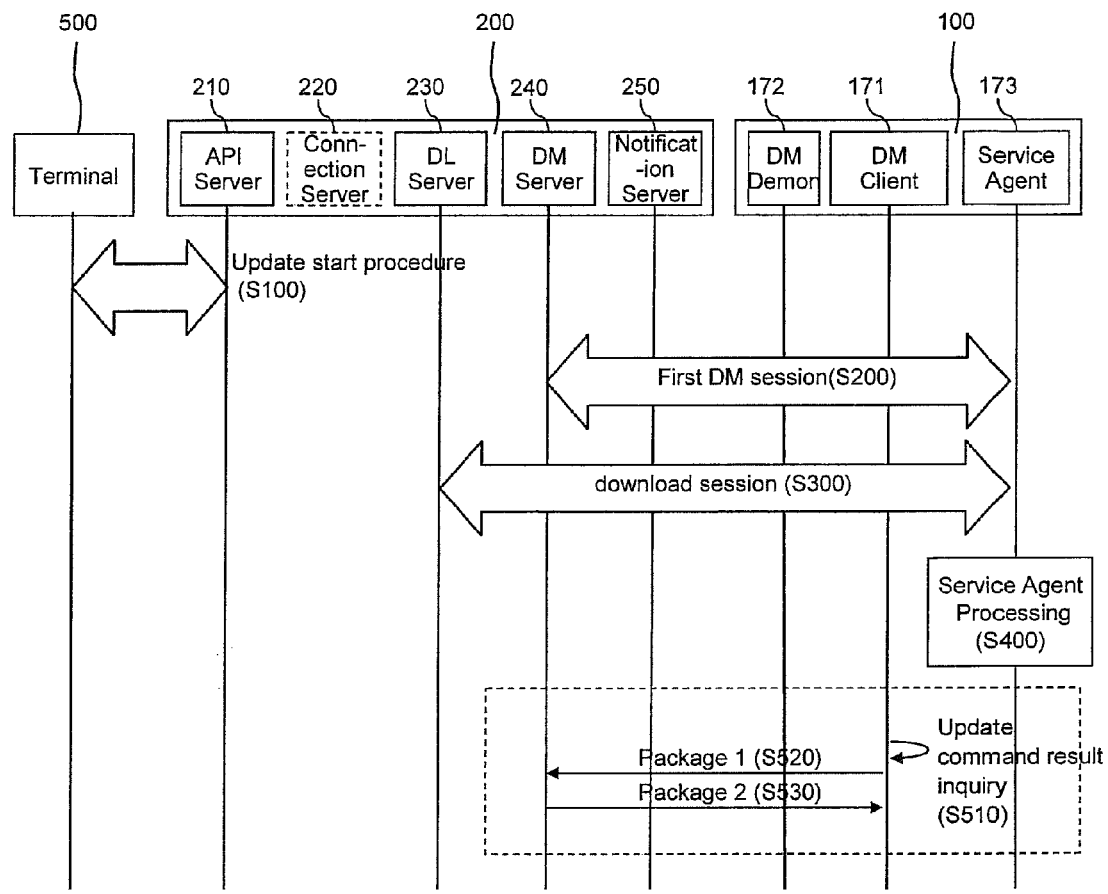
FIG. 10 is a flowchart illustrating a method in which an electronic device updates firmware based on a firmware update command.

FIG. 10 illustrates a process of informing the firmware update result to the management server 200 through a second DM session S500. In detail, the electronic device 100 checks the execution result of the firmware update command (S510), and transmits the checked execution result to the management server 200 by including in a package 1 (S520). In turn, the management server 200 transmits a package 2 in response to the package 1 (S530).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. An electronic device comprising:
 a communication unit configured to communicate with a management server;
 a memory including a first storage area, a second storage area, and a third storage area, wherein the first storage area and the second storage area are used for a first operating system, and the third storage area is used for a second operating system, wherein the first storage area is in an active state and stores a currently used operating system, and wherein the second storage area is in an inactive state; and a controller configured to:

receive, via the communication unit, update data including an updated first operating system to be updated from the management server, control the memory to store the received update data including the updated first operating system in the second storage area being in the inactive state, wherein when the received update data includes an updated second operating system, the controller controls the memory to store at least part of the received update data in the third storage area, control the first storage area storing the currently used first operating system to convert from the active state into the inactive state, control the second storage area storing the received update data including the updated first operating system to convert from the inactive state into the active state such that the updated first operating system included in the update data is executed, and execute the updated first operating system included in the update data stored in the second storage area being in the active state to update the currently used first operating system stored in the first storage area being in the inactive state.

2. The device of claim 1, wherein the update data has a form of a firmware image including the first updated operating system.

3. The device of claim 1, wherein the update data includes data for an updated portion of the first operating system or the entire updated operating system.

4. The device of claim 3, wherein a management command related to updating the currently used operating system is received through exchange of control messages based on an Open Mobile Alliance (OMA) device management standard.

5. The device of claim 4, wherein the management command instructs execution of downloading and updating.

6. The device of claim 1, wherein the controller stores the updated second operating system in the third storage area by transmitting the updated second operating system through a Universal Asynchronous Receiver/Transmitter (UART).

7. The device of claim 1, wherein the controller includes a first controller and a second controller;

wherein the first controller is configured to execute the currently used first operating system stored in the first storage area, and the second controller is configured to execute the second operating system for controlling a home appliance function, and wherein the first and second controllers are implemented by using separate hardware.

8. The device of claim 7, wherein the first controller is connected to a display module of the electronic device.

9. A firmware updating method comprising:

receiving via a communication unit, update data including an updated first operating system to be updated from a management server, controlling a memory to store the received update data in a second storage area of the memory being in an inactive state, wherein the memory includes a first storage area, the second storage area and a third storage area, wherein the first storage area and the second storage area are used for a first operating system, and the third storage area is used for a second operating system, wherein the first storage area is in an active state and stores a currently used first operating system;

wherein when the received update data includes an updated second operating system, controlling the memory to store at least part of the received update data in the third storage area;

controlling the first storage area storing the currently used first operating system to convert from the active state into the inactive state;

controlling the second storage area storing the received update data to convert from the inactive state into the active state such that the updated first operating system included in the update data is executed;

executing the updated first operating system included in the update data stored in the second storage area being in the active state to update the currently used first operating system stored in the first storage area being in the inactive state; and executing the updated second operating system included in the update data stored in the third storage area being in the active state to update the currently used second operating system.

10. The method of claim 9, wherein address information related to the update data is received through a message exchanging based on an Open Mobile Alliance (OMA) device management standard.

* * * * *